E. HENSLEY.
EGG CARRIER.
APPLICATION FILED APR. 10, 1915.
1,175,520.
Patented Mar. 14, 1916.
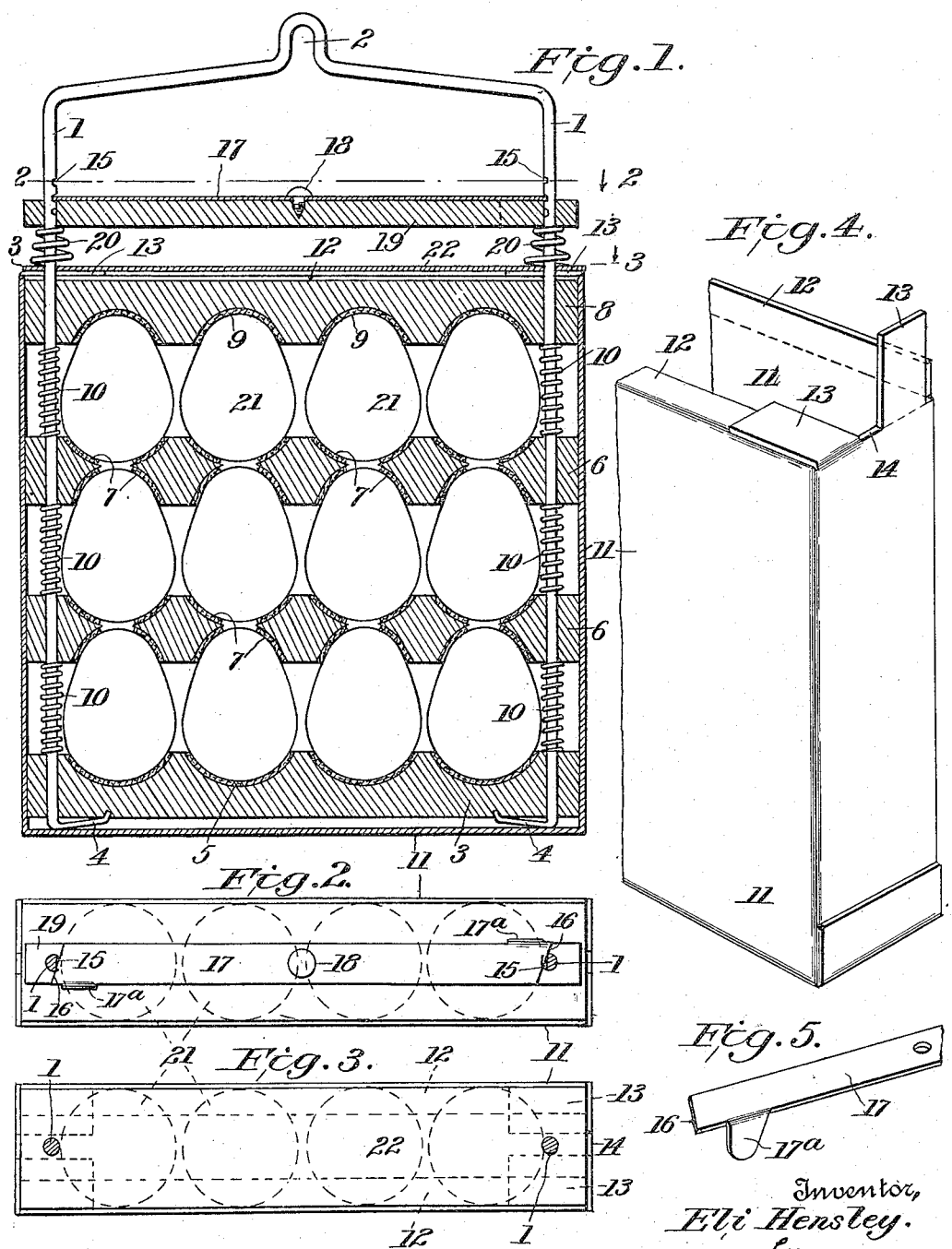

UNITED STATES PATENT OFFICE.

ELI HENSLEY, OF SAND SPRINGS, OKLAHOMA.

EGG-CARRIER.

1,175,520.

Specification of Letters Patent.

Patented Mar. 14, 1916.

Application filed April 10, 1915. Serial No. 20,389.

*To all whom it may concern:*

Be it known that I, ELI HENSLEY, a citizen of the United States, residing at Sand Springs, in the county of Tulsa and State of Oklahoma, have invented certain new and useful Improvements in Egg-Carriers, of which the following is a specification.

This invention relates to egg carriers or holders, and particularly to a container in which eggs may be shipped through the mails without danger of breakage.

My improved egg carrier is of the class which is intended to be used repeatedly, as distinguished from carriers constructed wholly of paper or the like and which are intended to be discarded after use.

The objects of the invention are to provide a device of this character which is strong, efficient in operation, and which may be conveniently handled, as well as one in which the eggs will be securely protected against breakage.

In order that the invention may be clearly understood, reference is had to the accompanying drawings, forming part of this specification, and in which, Figure 1 is a central longitudinal section through my improved carrier complete, showing the eggs in position; Figs. 2 and 3 are end or plan views, parts being in section, respectively on the lines 2—2 and 3—3 of Fig. 1; Fig. 4 is a fragmentary perspective view of the sheath or casing when removed from the egg carrying frame; and, Fig. 5 is a fragmentary perspective view of the swinging latch, hereinafter described.

Referring to the drawing in detail, my improved carrier consists of a casing or sheath, and an egg carrying frame which is bodily removable as a whole from such casing. The frame consists of a pair of side members or rods 1, which preferably are united by an arched connecting portion 2, which forms a bail by means of which the frame and associated parts may be conveniently carried or hung up.

At the lower end of the side members 1 is secured a cross bar 3, which may be fastened in any suitable way as, for example, by bending over or clenching the flattened ends of the rod 1, as indicated at 4. Arranged above the cross bar 3, and slidably supported upon the side members 1, are a series of cross bars or blocks 6. The cross bar 3 is provided on its upper surface with a plurality of felt-lined pockets 5, and the cross bars 6 are formed with a similar series of pockets 7 on each opposite face thereof. Another cross bar 8, similar to 3, is arranged at the top of the series, and is also slidable upon the rods 1. This cross bar has similar felt-lined pockets 9 upon its under face. Preferably disposed between each of the cross bars 3, 6, and 8, at their respective ends, are helical springs 10, surrounding the rods 1, and tending to force the said cross bars apart. It will thus be seen that the series of cross bars 3, 6, and 8, united by the rods 1, form an independent egg carrying frame of substantially rectangular shape, the eggs being gripped between the cross bars with their ends received in the felt-lined pockets, as clearly shown in Fig. 1, such eggs being indicated by the numeral 21.

The frame above described is adapted to be inserted in a casing or sheath, as shown in Figs. 1 and 4, and designated by the reference numeral 11. This casing or sheath may conveniently be made of paperboard or the like, and is permanently closed on all sides except the upper end. As shown in Fig. 4, this upper end is formed with foldable side flaps 12, and end flaps 13, the side flaps 12 being less than half the width of the casing, and the end flaps being formed in two sections as shown, with a space 14 between them, to receive the rods 1, as will be obvious.

After the eggs have been placed in the frame, as shown in Fig. 1, the frame is bodily inserted into the casing 11. The side and end flaps are then folded over on top of the endmost cross bar 8, and are clamped in position by means of a plate 22, threaded over the rods 1. Locking means are provided for holding this clamping plate down, and also for compressing the stack or series of cross bars so that the eggs are firmly gripped therebetween. This locking means preferably consists of a bar 19, slidable on the rods 1, and having pivoted to its upper side, as at 18, a swinging latch 17, the beveled ends 16 of which are adapted to engage notches 15, formed on the inside of the upper ends of the rods 1. Springs 20, surrounding the rods 1, are preferably interposed between the bar 19 and the clamping plate 22, such springs being stronger than the springs 10, interposed between the cross bars. It will thus be apparent that after the eggs have been placed in position and the frame inserted in the casing as described, the locking bar 19 and associated parts are pressed firmly downward, compressing springs 20 and 10, thus binding the clamping plate 22 in position and exerting a yielding pressure upon the whole series of cross bars so as to securely hold the eggs in place. It will, of course, be understood that the latch 17 is swung upon its pivot 18 so as to disengage its ends from the notches 15, and thus permit the locking bar to be lowered to the desired extent. The latch is then swung back into engagement with the notches. In order to facilitate the manipulation of the latch, it is preferably provided with downwardly extending lugs or ears 17$^a$, arranged one at each end, on opposite sides of the locking bar.

When it is desired to unpack the eggs, the bail 2 may be hung upon a hook or suitable support, and the latch 17 released. The clamping plate 22 can then be lifted and the flaps of the casing unfolded, whereupon the sheath or casing can be readily slipped off from the frame. The springs 10 tend to force the cross bars apart so as to release the eggs, but the bars may also be manually lifted as may be necessary to enable the eggs to be removed from the pockets.

Other forms of locking device may be employed without departing from the spirit of the invention. Also, the springs 10, which force the cross bars apart when the locking device is released, may, in some cases, be omitted. While I have shown the container as arranged to hold a dozen eggs disposed in three rows of four eggs each, it will, of course, be understood that four rows of three eggs each, or six rows of two eggs each, may be employed, if desired, and also, that the container may be made up in other sizes.

What I claim is:

1. An egg carrier comprising a pair of spaced side members, a plurality of blocks extending between and slidably mounted on said side members, said blocks having egg receiving pockets in their opposing faces, means for forcing said blocks together so as to grip the eggs between them, and means for locking said blocks in egg retaining position.

2. An egg carrier comprising a pair of spaced side members, a plurality of blocks extending between and slidably mounted on said side members, said blocks having pockets in their opposing faces adapted to receive the ends of eggs, said pockets being smaller than the eggs, and means for clamping the said blocks together so as to grip the eggs between them.

3. An egg carrier comprising a pair of spaced side members, a plurality of blocks extending between and slidably mounted on said side members, said blocks having pockets in their opposing faces adapted to receive the ends of eggs, and means independent of the eggs for resiliently urging said blocks together, so as to exert a yielding pressure on the eggs held between them.

4. An egg carrier comprising a pair of spaced side members, and a stack of superposed blocks slidably mounted on said members, such blocks being adapted to receive eggs between them, the first of said blocks being fixed to said members and means for exerting a yielding pressure upon the last of said stack of blocks, whereby all are resiliently held firmly together.

5. An egg carrier comprising a pair of spaced side members, a series of cross-bars slidably mounted on said side members, and adapted to receive eggs between them, means for locking said bars together in egg retaining position, and resilient means for moving said bars apart to egg releasing position when the locking means is released.

6. An egg carrier comprising a pair of spaced side members, a series of cross-bars slidably mounted on said side members, and adapted to receive eggs between them, springs mounted between each pair of such cross-bars tending to urge them apart, a locking bar for holding said cross-bars together, and springs between said locking bar and the endmost cross-bar, whereby a yielding pressure is exerted upon said series of cross-bars.

7. An egg holder comprising an inverted U-shaped frame having parallel side members, a plurality of blocks extending between and slidably mounted on the side members of said frame, said blocks having egg receiving pockets in their opposing faces, means for forcing said blocks together so as to grip the eggs between them, and a removable casing enveloping said blocks and side members, the upper part of said frame projecting beyond said casing to constitute a bail by which the holder may be carried.

8. An egg carrier comprising a casing open at one end and provided with foldable flaps, an egg carrying frame fitting within said casing and comprising a pair of side members and a series of cross-bars between which the eggs are held, a clamping plate adapted to grip the said foldable flaps between itself and the endmost of said cross-bars, and locking means for holding the said clamping plate and cross-bars in position.

In testimony whereof I have affixed my signature in presence of two witnesses.

ELI HENSLEY.

Witnesses:
B. F. BREEDING,
S. J. DYER.

Copies of this patent may be obtained for five cents each, by addressing the "Commissioner of Patents, Washington, D. C."